United States Patent
Limaye et al.

(10) Patent No.: US 7,606,986 B1
(45) Date of Patent: Oct. 20, 2009

(54) SYSTEM AND METHOD FOR RESOLVING SAN FABRIC PARTITIONS

(75) Inventors: Prasad Limaye, Pune (IN); Anand Das, Pune (IN); Amitava Guha, San Jose, CA (US)

(73) Assignee: Symantec Operating Corporation, Cupertino, CA (US)

( * ) Notice: Subject to any disclaimer, the term of this patent is extended or adjusted under 35 U.S.C. 154(b) by 565 days.

(21) Appl. No.: 10/929,215

(22) Filed: Aug. 30, 2004

(51) Int. Cl.
*G06F 13/14* (2006.01)

(52) U.S. Cl. .......................... 711/153; 711/6; 711/112; 714/6; 714/7; 714/8

(58) Field of Classification Search .................. 711/153
See application file for complete search history.

(56) References Cited

U.S. PATENT DOCUMENTS

| | | | |
|---|---|---|---|
| 6,732,104 B1 * | 5/2004 | Weber ........................ 707/10 |
| 6,775,230 B1 * | 8/2004 | Watanabe et al. ........... 370/228 |
| 6,978,300 B1 * | 12/2005 | Beukema et al. ............ 709/223 |
| 7,043,663 B1 * | 5/2006 | Pittelkow et al. ............... 714/4 |
| 7,424,533 B1 * | 9/2008 | Di Benedetto et al. ...... 709/226 |
| 2003/0126518 A1 * | 7/2003 | Binger ........................ 714/48 |

* cited by examiner

*Primary Examiner*—Hetul Patel
(74) *Attorney, Agent, or Firm*—Campbell Stephenson LLP

(57) ABSTRACT

Systems, methods, apparatus and software can combine information about host access to virtualization functionality and virtualization functionality access to storage, use this information in decisions pertaining to high availability of virtualization in an SAN. Upon detection of the partitioning of a SAN fabric, accessibility information is gathered. That information is analyzed to uncover potential failover scenarios, orchestrate such failovers, and in some cases select best case solutions from among several possible solutions based on access prioritization criteria (e.g., defined priority, maximum access, maximum I/O, etc.).

32 Claims, 7 Drawing Sheets

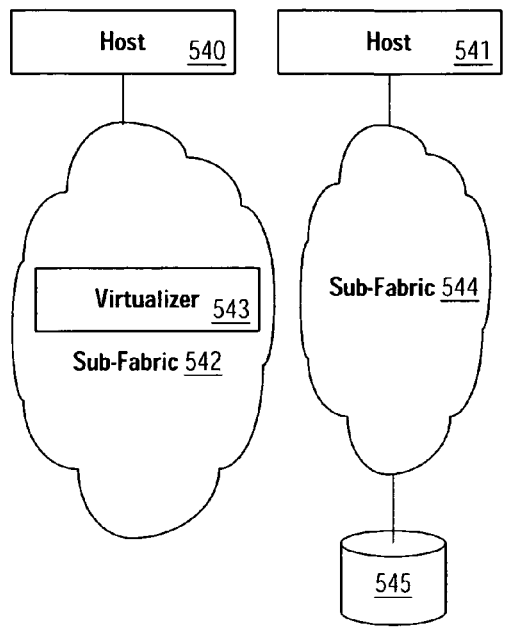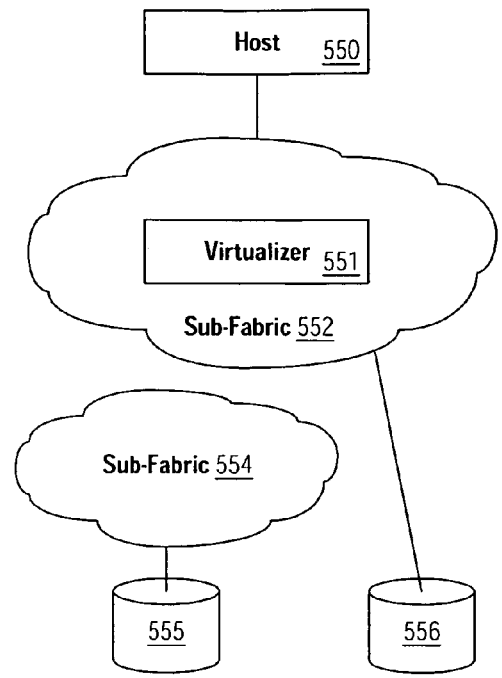
*FIG. 5E*  *FIG. 5F*
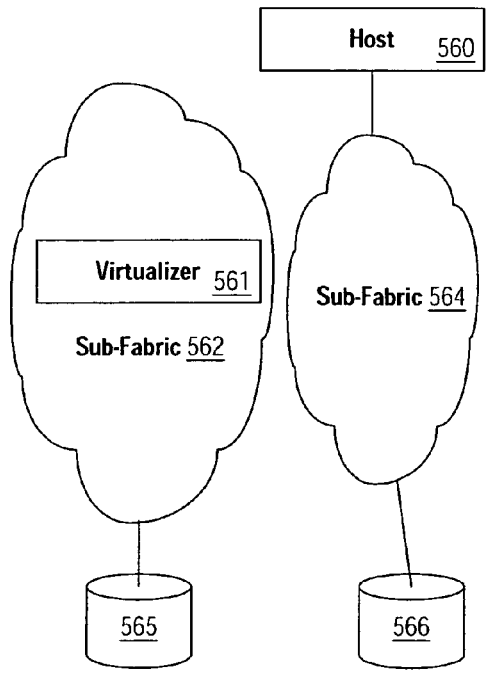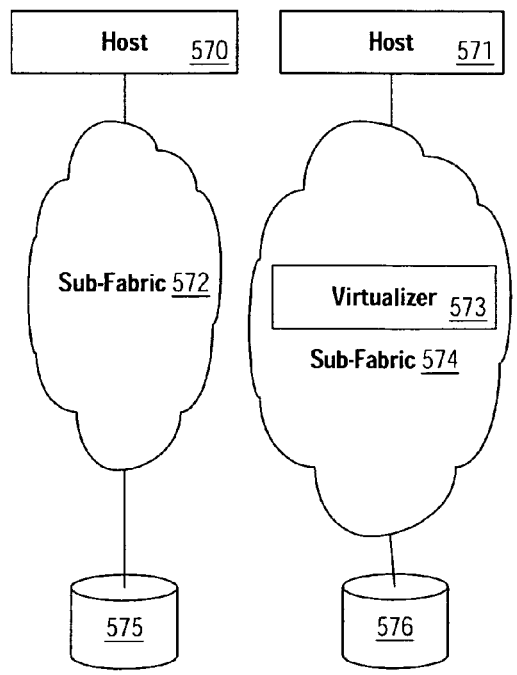
*FIG. 5G*  *FIG. 5H*

US 7,606,986 B1

SYSTEM AND METHOD FOR RESOLVING SAN FABRIC PARTITIONS

FIELD OF THE INVENTION

The present invention relates to the field of fault tolerance in storage networks and, more particularly, to resolving storage area network fabric partitions.

BACKGROUND OF THE INVENTION

Distributed computing systems are an increasingly important part of research, governmental, and enterprise computing systems. Among the advantages of such computing systems are their ability to handle a variety of different computing scenarios including large computational problems, high volume data processing situations, and high availability situations. Such distributed computing systems typically utilize one or more storage devices in support of the computing systems operations. The storage devices used by distributed computing systems can be organized and interconnected using a storage area network (SAN), which is typically a high-performance network whose primary purpose is to enable storage devices to communicate with computer systems and with each other.

These storage devices can be quite numerous and/or heterogeneous. In an effort to aggregate such storage devices and to make such storage devices more manageable and flexible, storage virtualization techniques can be used within SAN devices such as switches, routers, hubs, management computer systems, and so-called "smart" storage devices (e.g., disk arrays, data movers, and third-party copy devices). Storage virtualization techniques establish relationships between physical storage devices, e.g. disk drives, tape drives, optical drives, etc., and virtual or logical storage devices such as volumes, virtual disks, and virtual logical units (sometimes referred to as virtual LUNs). In so doing, virtualization techniques provide system-wide features, e.g., naming, sizing, and management, better suited to the entire computing system than those features dictated by the physical characteristics of storage devices. Additionally, virtualization techniques enable and/or enhance certain computing system operations such as clustering and data backup and restore.

FIG. 1 illustrates a simplified example of a distributed computing system 100. The members of the distributed computing system include Server A 110 and Server B 120. As members of distributed computing system 100, servers 110 and 120 are often referred to as "hosts" or "nodes." Thus, servers 110 and 120 are typically individual computer systems having some or all of the software and hardware components well known to those having skill in the art. FIG. 6 (described later in this application) illustrates some of the features common to such computer systems. Another common feature of a distributed computer system is the ability of the nodes to exchange data. In the example of FIG. 1, servers 110 and 120 can exchange data over network 150, typically a local area network (LAN), e.g., an enterprise-wide intranet, or a wide area network (WAN) such as the Internet. Additionally, network 150 provides a communication path for various client computer systems 140 to communicate with servers 110 and 120. In addition to network 150, servers 110 and 120 can communicate directly with each other over a private network (not shown). Private networks are typically used to support high availability where nodes 110 and 120 are part of a cluster, and include redundancy such as two network paths. Such networks can be used by the nodes for cluster service message passing including, for example, the exchange of so-called "heart-beat" signals indicating that each node is currently available to the cluster and functioning properly.

Other elements of distributed computer system 100 include storage area network (SAN) 130, SAN devices including virtualization functionality ("virtualizers") 132 and 134, and storage devices such as tape library 170 (typically including one or more tape drives), a group of disk drives 180 (i.e., "just a bunch of disks" or "JBOD"), and intelligent storage array 190. These devices are examples of the type of storage used in cluster 100. Other storage schemes include the use of shared direct-attached storage (DAS) over shared SCSI buses. SAN 130 can be implemented using a variety of different technologies including fibre channel arbitrated loop (FCAL), fibre channel switched fabric, IP networks (e.g., iSCSI), Infiniband, etc.

While SAN 130 can be implemented using a variety of different network topologies, e.g., point-to-point, arbitrated loop, and switched or "fabric", SAN 130 is shown as a switched network. In a switched SAN, each storage device and each SAN client is connected to one or more SAN devices, typically switches or routers, which make and break momentary connections between pairs of devices that need to communicate with each other. The term fabric is typically used to refer to such SAN configurations, portions of such SANs, and/or a collection of one or more SAN switches and client devices, such as hosts and storage.

SAN switches 132 and 134 are illustrated as virtualizers because each are designed to present one or more virtual storage devices, e.g., volumes or VLUNs, 133 and 135. Applications and system software (e.g., operating systems, file systems volume managers, etc.,) on hosts 110 and 120 and applications executing on client computer systems 140 can initiate or request I/O operations against virtual storage devices presented by virtualizers 132 and 134. These I/O operations typically include read and write operations to logical or virtual devices such as volumes, virtual LUNs, and/or virtual disks designed to appear and operate as SCSI LUNs. Virtualizers 132 and 134 in turn prepare physical I/O operations directed at various attached physical storage devices.

To further enhance functionality in distributed computer system 100, hosts 110 and 120 can each utilize more than one I/O port on SAN devices via dynamic multipathing (DMP) device drivers as well as multiple host bus adaptors (HBAs) (not shown). The HBAs provide multiple hardware interfaces between the host bus and the storage network for redundancy and/or I/O load balancing. Similarly, one or more of the physical storage devices can be connected to SAN devices through multiple I/O paths. DMP functionality generally enables greater reliability and performance by using path failover and load balancing. Multipathing policies used by DMP drivers depend on the characteristics of the devices in use. For example, active/active policies permit several paths to be used concurrently for I/O operations, thereby providing greater I/O throughput by balancing the I/O load uniformly across multiple paths. In the event of a loss of one connection, a DMP driver automatically routes I/O operations over the other available connection(s). Active/passive connections allow I/O operations on a primary (active) path while a secondary (passive) path is used if the primary path fails.

While there are many advantages to providing storage virtualization within a SAN, high availability of virtualization in the SAN depends on access by virtualization devices to back-end storage and availability of host access to the virtualization devices. Current high availability solutions consider each of these problems separately. Moreover, there are numerous ways in which device or communication path failure can partition a SAN fabric into two or more subfabrics resulting in the loss of access from an application host to a switch or from a switch to back-end devices. Such fabric partitions not only limit the usability of a SAN, but they can potentially lead to data corruption.

Accordingly, it is desirable to have scalable, flexible, and robust techniques for handling and repairing SAN fabric partitions, particularly where the SAN fabric includes more than one SAN device providing storage virtualization.

SUMMARY OF THE INVENTION

It has been discovered that systems, methods, apparatus and software can combine information about host access to virtualization functionality and virtualization functionality access to storage, use this information in decisions pertaining to high availability of virtualization in an SAN. Upon detection of the partitioning of a SAN fabric, accessibility information is gathered. That information is analyzed to uncover potential failover scenarios, orchestrate such failovers, and in some cases select best case solutions from among several possible solutions based on access prioritization criteria (e.g., defined priority, maximum access, maximum I/O, etc.).

Accordingly, one aspect of the present invention provides a method. Information indicating a partition of a storage area network (SAN) fabric is received. The SAN fabric includes a SAN device configured to present a virtual storage device. Information describing connectivity of the SAN device to at least one of a host computer system, a physical storage device, and another SAN device is analyzed. It is determined whether the SAN device can continue to present the virtual storage device. The virtual storage device is allowed to be accessed by at least one of the host computer system and another host computer system when it is determined that the SAN device can continue to present the virtual storage device.

In another aspect of the present invention, a system includes a memory, a processor coupled to the memory, and a storage area network (SAN) fabric repair module. At least a portion of the SAN fabric repair module is encoded as instructions stored in the memory and executable on the processor. The SAN fabric repair module is configured to receive information indicating a partition of an SAN fabric. The SAN fabric includes an SAN device configured to present a virtual storage device. The SAN fabric repair module is further configured to determine whether the SAN device can continue to present the virtual storage device after the partition of the SAN fabric, and allow the virtual storage device to be accessed by at least one of a host computer system and another host computer system when it is determined that the SAN device can continue to present the virtual storage device.

In still another aspect of the present invention, a computer readable medium includes program instructions executable on a processor. The computer readable medium is at least one of an electronic storage medium, a magnetic storage medium, an optical storage medium, and a communications medium conveying signals encoding the instructions. The program instructions are operable to implement each of receiving information indicating a partition of a storage area network (SAN) fabric, wherein the SAN fabric includes a SAN device configured to present a virtual storage device; analyzing information describing connectivity of the SAN device to at least one of a host computer system, a physical storage device, and another SAN device; determining whether the SAN device can continue to present the virtual storage device; and allowing the virtual storage device to be accessed by at least one of the host computer system and another host computer system when it is determined that the SAN device can continue to present the virtual storage device.

Yet another aspect of the present invention provides an apparatus comprising a means for receiving information indicating a partition of a storage area network (SAN) fabric, wherein the SAN fabric includes a SAN device configured to present a virtual storage device; a means for determining whether the SAN device can continue to present the virtual storage device; and a means for allowing the virtual storage device to be accessed by at least one of the host computer system and another host computer system when it is determined that the SAN device can continue to present the virtual storage device.

The foregoing is a summary and thus contains, by necessity, simplifications, generalizations and omissions of detail; consequently, those skilled in the art will appreciate that the summary is illustrative only and is not intended to be in any way limiting. As will also be apparent to one of skill in the art, the operations disclosed herein may be implemented in a number of ways including implementation in hardware, i.e. ASICs and special purpose electronic circuits, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

A more complete understanding of the present invention and advantages thereof may be acquired by referring to the following description and the accompanying drawings, in which like reference numbers indicate like features.

FIGS. 5A-5H illustrate example fabric partition scenarios.

DETAILED DESCRIPTION

The following sets forth a detailed description of at least the best contemplated mode for carrying out the one or more devices and/or processes described herein. The description is intended to be illustrative and should not be taken to be limiting.

Figure 1:
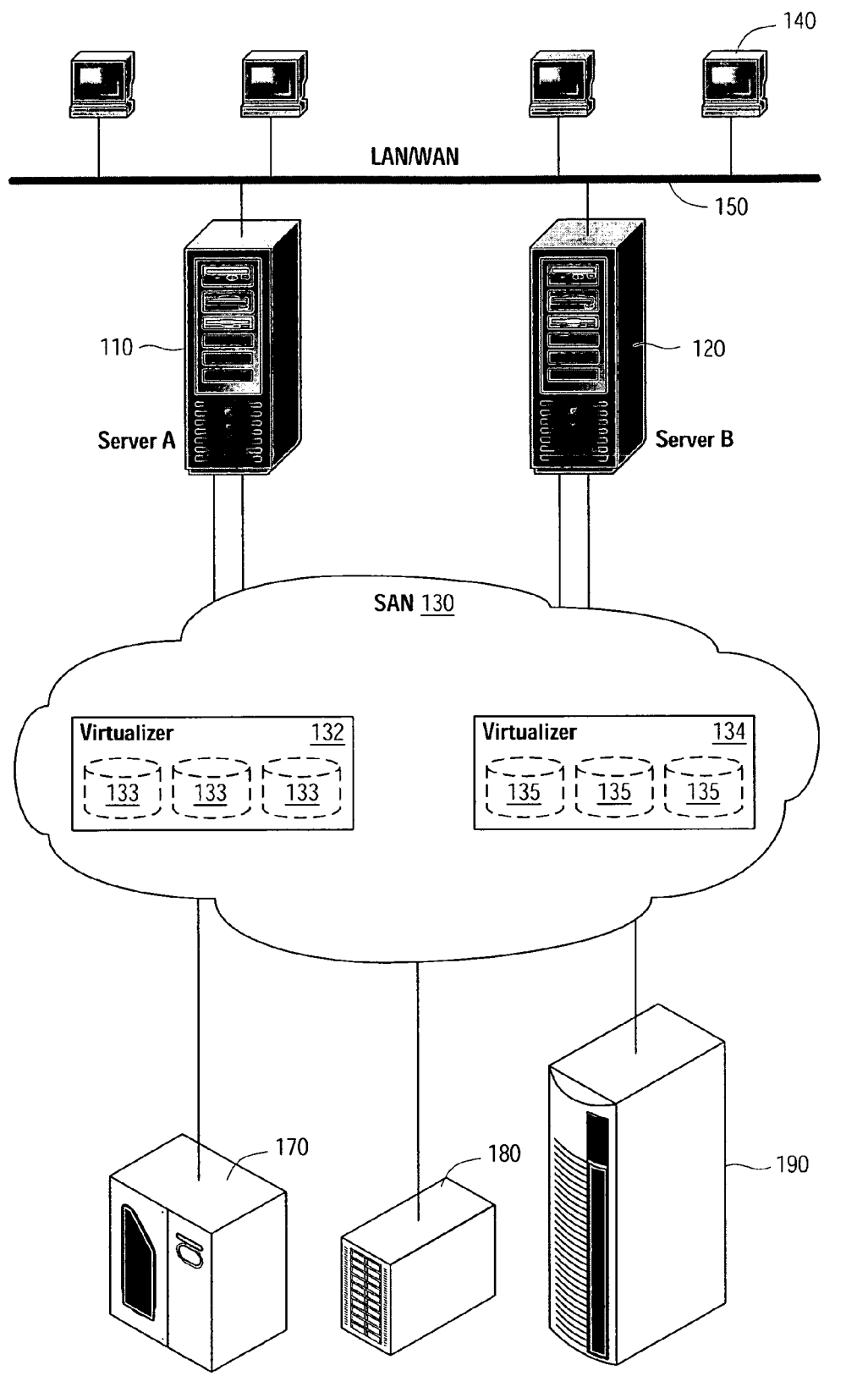
FIG. 1 is a simplified block diagram of a computing system including a SAN fabric.
Figure 2:
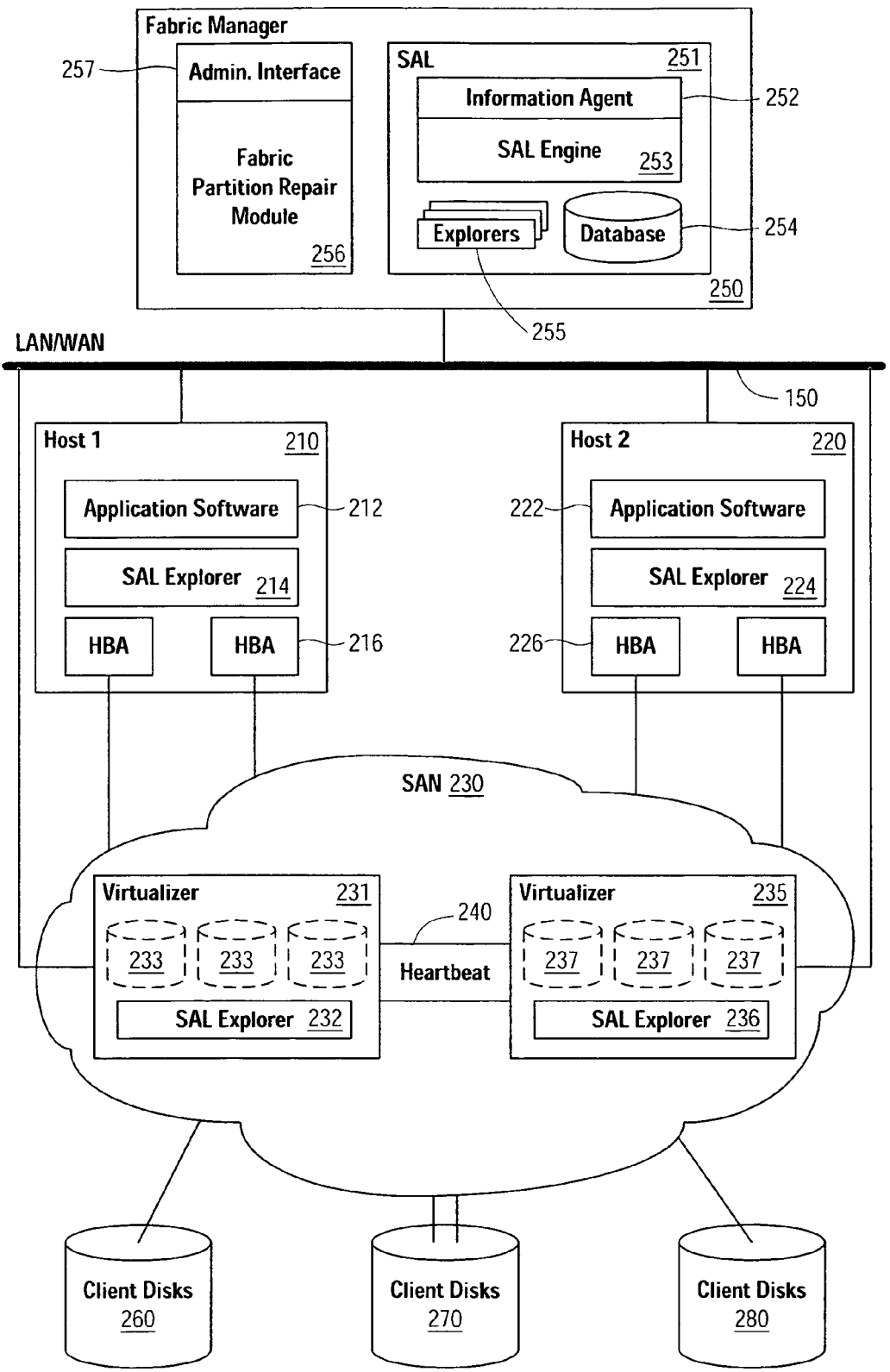
FIG. 2 is a simplified block diagram of a computing system including a SAN fabric and illustrating some of the software and techniques disclosed in the present application.

FIG. 2 is a simplified block diagram of distributed computing system 200 utilizing some of the systems and methods of the present invention. Computing system 200 includes a hosts 210 and 220 coupled to both LAN/WAN 150 and SAN 230. Computing system 200 also includes a fabric manager 250, typically implemented as a conventional computer system such as a server, that assists in managing the SAN fabric and repairing fabric partitions when they occur. As shown, fabric manager 250 is coupled to LAN/WAN 150, allowing the manager to communicate with SAN connected hosts and SAN devices, such as virtualizers 231 and 235. In other embodiments, fabric manager 250 can also be coupled directly to the SAN. Various storage devices, e.g., client disks 260, 270, and 280 are coupled to SAN 230. As described above with respect to FIG. 1, various different types of storage devices can be utilized by a SAN, and thus client disks

260, 270, and 280 are merely illustrative of some types of storage devices that can be used by SAN 230.

Hosts 210 and 220 include application software (212 and 222) such as database administration systems (DBMS), file servers, application servers, web servers, backup and restore software, customer relationship management software, and the like. Hosts 210 and 220 also typically include various pieces of system software (not shown) such as operating system software, volume management software, clustering software, and dynamic multipathing software (DMP) and supporting path discovery software. Hosts 210 and 220 use SAN access layer (SAL) explorer software (described in greater detail below) to discover various SAN devices and storage devices coupled to the SAN. HBAs 216 and 226 provide multiple interfaces to SAN 230 for each host in support of DMP functionality. In addition, one or more of storage devices attached to the SAN can include similar functionality. Thus, for example, client disks 270, e.g., an intelligent array, includes multiple paths in support of DMP or similar functionality.

Chief among the many devices that can be part of SAN 230 are virtualizers 231 and 235. Like virtualizers 132 and 134 of FIG. 1, virtualizers 231 and 235 are designed to present one or more virtual storage devices, e.g., volumes or VLUNs, 233 and 235. Virtualizers 231 and 235 each include their own instance of SAL explorer software (232 and 236) for SAN exploration and device discovery, in addition to any virtualization software such as volume managers, volume servers, etc. (not shown). Although SAN 230 is shown having two virtualizers, this need not be the case. Numerous examples exist where only one virtualization device, e.g., a single SAN switch, is included in the SAN. Similarly, more complex SANs can include more than two virtualizer devices, or some combination of SAN devices that provide storage virtualization services and SAN devices that do not. Nevertheless, the example illustrated in FIG. 2 provides two virtualizers that communicate with each other over one or more communication pathways 240 (typically a private network) to exchange system information and to monitor each other, i.e., exchange heartbeat signals.

Heartbeating can be used among SAN devices and particularly virtualizers to detect the occurrence of a SAN fabric partition. Various different software, hardware, and/or interconnect failures can give rise to a fabric partition where one or more paths between hosts and SAN devices are disconnected, where one or more paths between SAN devices and physical storage devices are disconnected, and even when various SAN devices become disconnected from each other. A fabric partition results in creating two or more subfabrics, each of which can contain zero or more virtualizers. The subfabrics which do not contain at least one virtualizer are generally of less concern because they cannot be used to expose VLUNs in that subfabric.

In the simplest example, virtualizers 231 and 235 periodically exchange information between each other, thereby indicating that the devices are operating normally. More detailed device information can be exchanged. In one embodiment where virtualizers 231 and 235 support fibre channel networks, the virtualizers exchange information using the fibre channel common transport (FC-CT) protocol defined by the fibre channel standard to provide access to services provided by SAN devices and accessible via SAN device ports. Examples of such services include the directory service and alias services. Thus, in another example fabric partitioning can be detected by periodically polling at regular or irregular intervals one or more SAN devices, such as name servers or directory servers, to determine fabric membership. In yet another example, software designed to discover SAN devices, SAN storage, and clients of the SAN can be used to determine the current "picture" of the SAN and thereby determine when a fabric partition has occurred. Still other heartbeating techniques and techniques for discovering fabric partitions will be known to those having ordinary skill in the art.

Virtualizers 231 and 235 typically implement in-band or out-of-band storage virtualization, as opposed to host-based storage virtualization or storage-based virtualization, thereby providing users with virtualization between the hosts and the storage. Using a storage appliance such as a specialized switch, router, server, or other storage device, in-band and out-of-band storage virtualization allows for the same level of control and centralization across the storage architecture. An in-band virtualization device is physically located between the host and the storage. The appliance takes the disk requests from the host and fulfills the host's request from the storage attached to the other side of the appliance. This functionality is essentially transparent to the host because the appliance presents itself as disk. Out-of-band devices logically present themselves as if they are located in the data path between the host and storage, but they actually reside outside of the data path. Thus, in an out-of-band implementation the data flow is separated from the control flow. This is accomplished, for example, with the installation of a "thin" virtualization driver on the host in the I/O data path. The out-of-band device provides the virtualization driver with the storage mappings. The virtualization driver presents virtual storage devices to the applications and file systems on the host and sends the blocks of data directly to correct destinations on disks. In contrast, the in-band appliance requires no host-side changes. It acts as a surrogate for a virtual storage device and performs mapping and I/O direction in a device or computer system located outside of the host.

In one example, virtualizers 231 and 235 support an out-of-band virtualization scheme used to provide hosts 210 and 220 with access to shared storage devices 260, 270, and 280. In such an example, the virtualization of the shared storage devices is typically accomplished using at least two system components, a virtual device configuration server that presents a consistent view of the shared storage and a virtual device configuration client (i.e., a client of the virtual device configuration server) that receives the virtualization information and uses it as part of the client's normal operation. Virtualizers 210 and 220 can get virtualization related metadata from back-end devices directly, e.g., using a virtual device configuration server within the virtualizers, or by contacting some other host which is responsible for managing metadata, e.g., using virtual device configuration clients within the virtualizers. In general, the fabric repair systems, software, and techniques described in the present application are applicable to any type of virtualization technique employed within a SAN.

In one embodiment, the virtual storage devices presented by virtualizers 231 and 235 are organized as are virtual LUNs, or VLUNs, which are logical units exposed by the virtualizers for host access. Hosts can access these VLUNs as a simple SCSI LUN. Virtualizers 231 and 235 can make logical volumes, e.g., established by volume management software such as the VERITAS Volume Manager™ product (or similar functionality) provided by VERITAS Software Corporation, into VLUNs by associating the logical volumes with a virtual enclosure (VE) that is accessible through one or more virtual enclosure ports (Vports). Thus, a SCSI enclosure associated with a VLUN can be a virtual enclosure. Unlike physical enclosures, VEs do not belong to a physical chassis nor are they tied to a physical location within the SAN environment.

VEs are generally accessible across an entire SAN, allowing any host access to any VLUN within any VE. Virtual enclosure ports are the virtual ports used by hosts to "directly connect" to a set of VLUNs in a given VE. Vports are typically similar to ports, e.g., fibre channel N-ports, available on a physical storage devices such as disk arrays. The virtualizers can also be configured to map VLUNs to, and mask VLUNs from specific Vports within a VE. In this manner, virtualizers 231 and 235 provide access to various back-end storage devices including physical devices, e.g., client disks 260-280, and even other virtual storage devices, e.g., other VLUNs exported to the SAN by some other virtualization scheme such as virtualization within a disk array.

As illustrated in FIG. 2, fabric manager 250 is a central entity that manages the SAN, discovers various SAN components, and provides fabric repair functionality. Because the computing system 200 can include numerous hosts, storage devices, and SAN devices, fabric manager 250 coordinates device discovery and configuration by automating, or at least partially automating, the task of discovering available devices, their attributes, physical connections, logical connections, status, and the like. Fabric manager 250 includes SAN access layer 251 which typically includes one or more components such as SAL engine 253, information agent 252, explorers 255, and database 254. SAL engine 253 provides core device discovery services. SAL engine 253 typically performs a variety of functions such as: coordinating the activity of the explorers 255, managing changes to the database 254, and performing zoning operations by communicating with bridges and switches on the SAN 230. Although shown implemented on fabric manager 250, SAN access layer 251 can generally operate on any computer system with adequate resources and access to SAN devices and explorers.

Explorers 255 are discovery modules running within the SAL process and in some cases on other devices such as hosts 210 and 220, and virtualizers 232 and 236. Each explorer typically uses a different method to discover information about objects on the SAN, and so multiple explores can be used by various devices. Moreover, explorers may be designed for specific types of devices (host bus adapters, disk arrays, bridges, tape devices), protocols (SNMP), networks, applications, etc. Thus, in some embodiments, explorers provide an interface to different types of heterogeneous SAN components so that SAL 251 can provide a common data representation for heterogeneous SAN components. Explorers may communicate with the SAN components in an in-band fashion over the SAN fabric (e.g., fibre channel or SCSI) and/or in an out-of-band fashion over other networks (e.g., Ethernet) in order to inventory the SAN. Moreover, explorers operating outside SAL 251, such as explorers 214, 224, 232, and 236, can communicate with SAL 251 to provide similar information. Such explorers are often used from devices that may have device access and/or SAN visibility that is different from that of explorers 255.

The SAN access layer engine 253 aggregates the information it receives from various explorers into database 254. Once the various entities of SAN 230 are discovered, SAL 251 can continue to monitor the SAN and may update database 254 as new devices become available, as devices change states, or as events occur on the SAN. In one embodiment, SAL 251 periodically examines the SAN to discover or determine objects that are added, objects that are removed, and connections that have changed. Data collected in database 254 is typically updated in a real-time or periodic manner, and distributed to any other devices or software entities that might need the information. Data from database 254 can be provided to other devices or software entities via information agent 252. For example, information agent 252 can translate information from database 254 into formatted files (e.g. XML files), which can be provided to client applications, such as fabric partition repair module 256 (described below). Additionally, a specially designed SAN access layer (SAL) application programming interface (API) (not shown) can provide various other programs in the system with specialized access to and control of the information in database 254 through function and procedure calls accessible through the API.

Fabric partition repair module 256 operates in conjunction with and uses data gathered by SAN access layer 251 to repair discovered fabric partitions. While fabric partition repair module 256 typically cannot perform repairs on physical devices, it can change ownership of affected VLUNs to minimize the impact of fabric partition. To accomplish this, fabric partition repair module 256 identifies those VLUNs which can be presented by one or more virtualizers in viable sub-fabrics, and can be accessed by hosts using those VLUNs. Virtualizers are subsequently instructed, as necessary, to present those VLUNs. Additionally, fabric partition repair module 256 can implement algorithms to identify VLUNs that could be presented if one or more failover paths are used, e.g., within the context of DMP functionality. In such instances, it may be necessary or desirable to determine whether such path failover would adversely affect other VLUNs that have been presented or at least have been identified as viable. Thus, path failover analysis algorithms can operate under certain constrains such as maximizing the number of VLUNs that can be successfully presented, maximizing potential I/O (e.g., ensure that high volume VLUNs are preferentially preserved), and exposing VLUNs based on some manner of VLUN or host priority. In general, fabric partition repair module 256 uses host-to-virtualizer and virtualizer-to-storage connectivity information to provide VLUN access after a fabric partition event. Administration interface 257 provides an entry point into the administration of fabric partition repair module 256. For example, using administration interface 257, an administrator can run reports on the system, configure fabric repair parameters, perform manual repair tasks, and the like. Administration interface 257 is typically implemented as a command line interface and/or a graphical user interface.

As illustrated in FIG. 2, each of the described pieces of software are shown as separate software modules. These modules, and indeed any of the software modules described herein, can be combined in various ways to form single software modules, implemented on separate computer systems, executed as separate threads on a single computer system, etc. Such variation of implementation will be well within the skill of those having ordinary skill in the art. Additionally, although a particular scheme is illustrated for gathering information about various SAN components, numerous other techniques can be implemented so long as fabric partition repair module 256 has access to the connectivity information needed to perform its operations. For example, in one embodiment virtualizers 210 and 220 report SAN connectivity information directly to fabric partition repair module 256 and SAL functionality is not used. Such reporting by the virtualizers can be done on a regular basis, or on an irregular basis such as when a virtualizer detects a fabric partition.

Figure 3:
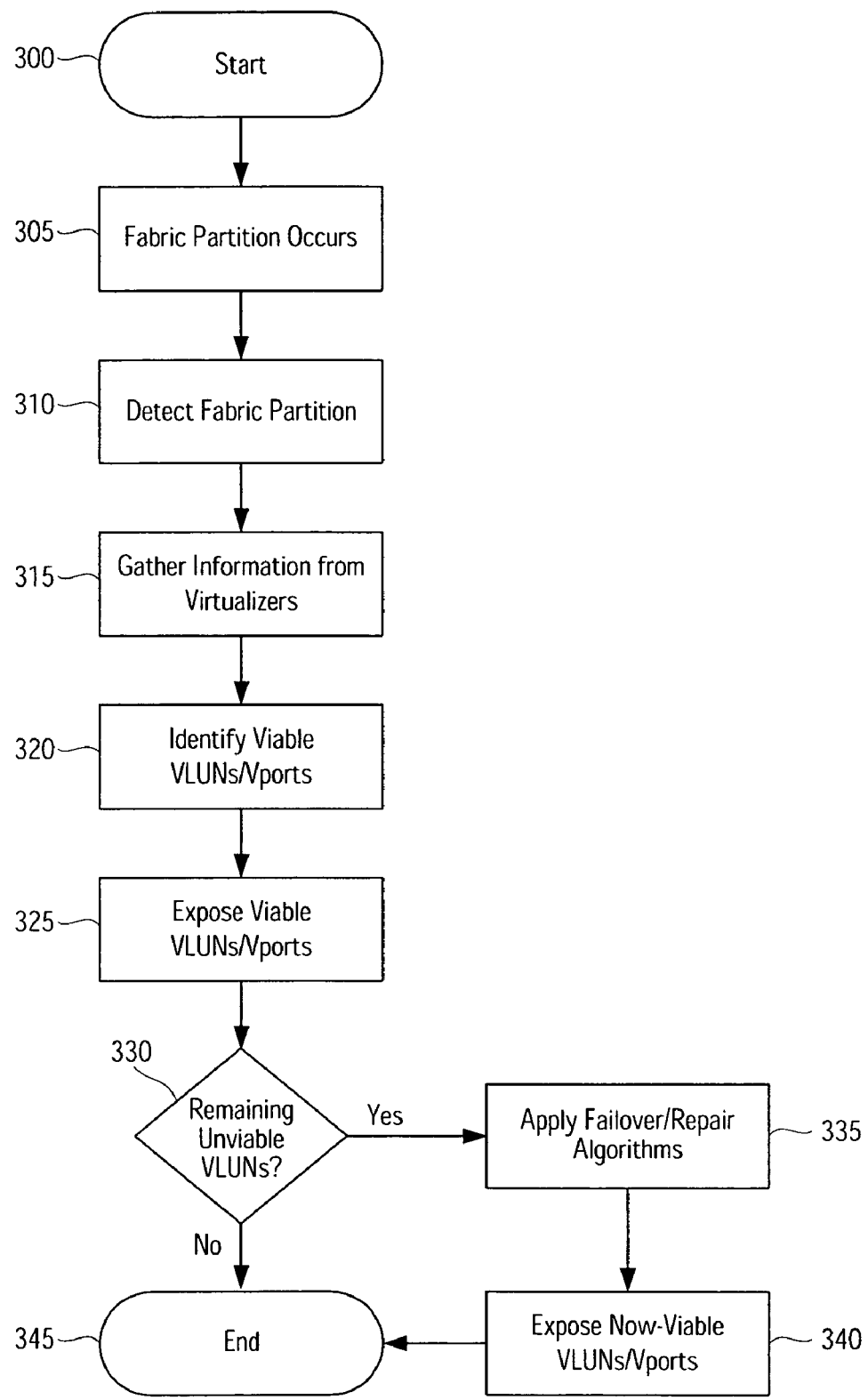
FIG. 3 is a flow chart illustrating fabric partition repair techniques disclosed in the present application.
Figure 4:
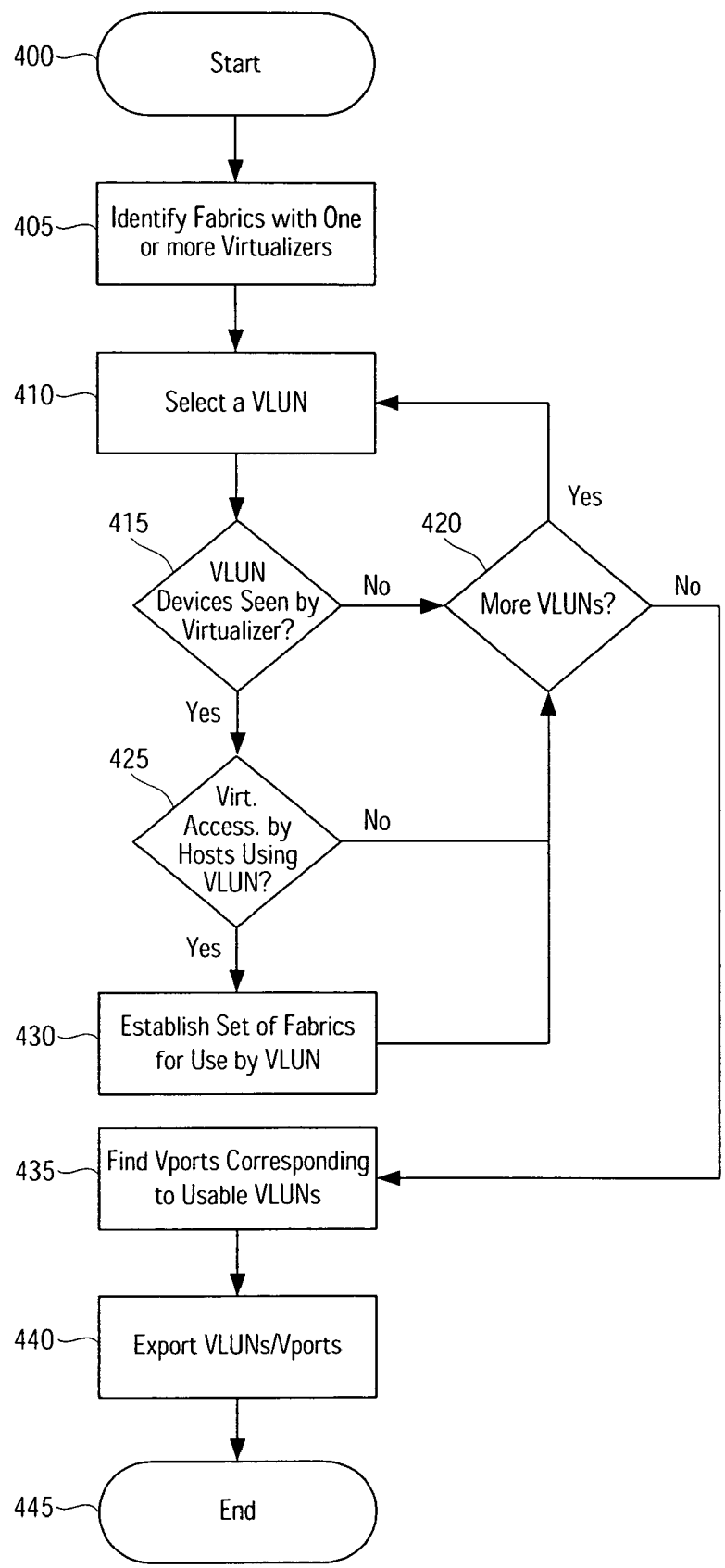
FIG. 4 is a flow chart further illustrating fabric partition repair techniques disclosed in the present application.

FIG. 3 is a flow chart illustrating fabric partition repair techniques disclosed in the present application. In particular, FIG. 3 illustrates the basic processes involved in fabric repair, while FIG. 4 illustrates some of those processes in further detail. The process begins at 300 where a user, administrator, or software has configured software such as fabric partition repair module 256 to be ready to handle partition events. In step 305, a fabric partition event occurs. This event might include one or more hardware failures (e.g., SAN devices, interconnects) or software problems that cause certain devices to malfunction. Moreover, the fabric partition event may include multiple separate events leading to the formation of one or more subfabrics. The partition event is detected in 310. As noted above, detection of a fabric partition event can occur at the virtualizer level via, for example, failure to receive a heartbeat signal. In other examples, a virtualizer may detect that it has lost connection with a device through normal means, e.g., I/O operations timeout or the virtualizer receives explicit error messages. In one example, device in the SAN detect the partition and report that information to a central entity such as fabric manager 250. In still other embodiments, a central entity actively examines devices and the SAN for fabric partition conditions. Numerous different mechanisms can be used to detect a fabric partition and convey that information to software designed to perform repair operations.

Upon partition detection, other operations not illustrated can be performed. For example, the central entity coordinating repair of the fabric can inform hosts using the SAN that an error condition has occurred and that some or all I/O's targeting the SAN should be suspended. This might be particularly important if there is a danger of data corruption due to the SAN partition. The central entity coordinating repair can also inform virtualizers and other SAN devices to suspend pending I/Os and/or reject new I/Os until the partition is satisfactorily repaired. In step 315 virtualizer connectivity information is gathered. In many cases, such information will already be available to the fabric partition repair software. In other cases, the central entity will have to request such information from virtualizers. In still other cases, the virtualizers will report their "view" of the SAN to the fabric partition repair software (or some appropriate agent of the fabric partition repair software) once they have determined that a partition event has occurred.

Next, connectivity information for fabric partitions with one or more virtualizers is examined to identify VLUNs (and in cases where VLUNs are associated with other virtual entities like Vports or VEs, those entities) that can be presented by presented by the virtualizer and accessed by hosts using those VLUNs (320). An example of the connectivity information examination process is illustrated in FIG. 4 as described below. Once viable VLUNs are identified, those VLUNs are exposed or presented for use by hosts (325). This process can include instructing appropriate virtualizers to begin or resume presenting the VLUNs. In 330, it is determined whether there are remaining VLUNs that had been in use by hosts but cannot currently be presented by a virtualizer because of the fabric partition. If so, various additional path failover algorithms or further fabric repair algorithms can be applied (335). For example, devices that are interconnect using multiple paths, e.g., one active and one passive communications path, can be examined to determine whether initiating a path failover operation will allow unviable VLUNs to be rendered viable. Many different alternatives might need to be examined if path failover operations will affect existing viable LUNs. Moreover, there may not be solutions where all unviable VLUNs can be repaired into the fabric, so the algorithms can take into consideration certain weighing parameters such as I/O bandwidth, priority, maximum connectivity, etc. Once designated failover operations are chosen and applied, the now-viable VLUNs can be presented (340) in a manner similar to that described in connection with step 325. Operation then transitions to 345 where the process is complete. Similarly, if there are no remaining unviable VLUNs as determined in 330, then operation proceeds to 345.

FIG. 4 illustrates one example of a technique for use in identifying VLUNs and corresponding Vports that can be used after a partition event. The process starts at 400 where it has been invoked, for example, by a central entity such as fabric partition repair module 256. As illustrated, this process assumes that relevant device connectivity and status information is available for analysis. In step 405, all of the subfabrics are examined to determine whether there is at least one operational virtualizer in the subfabric. Subfabrics without operational virtualizers cannot be used to present VLUNs, and so are ignored by the process. Once subfabrics with one or more virtualizers are identified, a target VLUN is selected (410). In general, a VLUN is selected from a list of VLUNs in use prior to the partition event. In step 415, it is determined whether the physical storage devices (e.g., disk drives) used by the selected VLUN can be successfully accessed ("seen") by the virtualizer(s) identified in 405. If one or more of the devices required for the selected VLUN cannot be seen by one or more of the virtualizers identified in 405, then operation transitions to 420 where a determination is made whether there are more VLUNs to examine. If so, operation returns to 410 where the next VLUN is selected for examination. If there are no more VLUNs for examination, operation proceeds to 435 as will be discussed below.

If there are one or more virtualizers that can see the devices needed to present the selected VLUN, the successful result of step 415 is a set of subfabrics/virtualizers that are candidates for presenting the VLUN. Operation transitions to step 425 where it is determined whether the virtualizers identified in 415 can be accessed by hosts that were using the selected VLUN prior to fabric partition, and/or are designated as hosts that should be able to access the selected VLUN. In one example, the VLUN is discarded and operation transitions to 420 only if there are no hosts using the selected VLUN that can access the identified virtualizers. In an alternate embodiment, so long as there is at least one host that can access the identified virtualizers among the set of hosts using the selected VLUN, then operation can proceed to 430. Thus, the successful result of step 425 is a set of one or more fabrics/virtualizers corresponding to the selected VLUN that can both (1) see all physical devices needed to present the VLUN and (2) be seen by at least one (or in some cases all) hosts using the selected VLUN. Note that in some implementations, only one virtualizer will be allowed to present any one VLUN, and thus the successful result of step 425 will include one and only one virtualizer.

The viable fabrics/virtualizers for the selected VLUN, and any related connectivity parameters, are recorded in step 430, and operation returns to 420 to determine if there are additional VLUNs to examine. When there are no more VLUNs to examine, Vports are examined for corresponding usable VLUNs and/or usable VLUNs are inspected to determine corresponding Vports (435). Once all relevant information is established, the VLUNs/Vports are exported in 440. As noted above, this step can include instructions to appropriate virtualizers to begin/resume presenting the viable virtual devices. The process terminates at 445.

The flow charts of FIGS. 3 and 4 illustrate some of the many operational examples of the fabric repair tools and techniques disclosed in the present application. Those having ordinary skill in the art will readily recognize that certain steps or operations illustrated in FIGS. 3 and 4 can be eliminated or taken in an alternate order. Moreover, the methods described in FIGS. 3 and 4 are typically implemented as one or more software programs for a computer system and are encoded in a computer readable medium as instructions executable on one or more processors. The computer readable medium can be any one of an electronic storage medium, a magnetic storage medium, an optical storage medium, and a communications medium conveying signals encoding the instructions. Separate instances of these programs can be executed on separate computer systems in keeping with the multi-process methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of different storage devices and computing systems with variations in, for example, the number of nodes, the type of operation (e.g., cluster failover or parallel operation, etc.), the number and type of shared data resources, the number of paths between nodes and shared data resources, and the number and type of SAN devices.

FIGS. 5A-5H illustrate various different fabric partition scenarios and some of the operations that can be performed in order to repair, or at least partially repair, the fabric. Each of FIGS. 5A-5H consider a single volume/VLUN formed using one or two back-end devices and being accessed by one or two hosts. Only active paths to back-end devices are illustrated. Additional passive paths may be present and will be described as appropriate. In some cases described below, path-failover/VLUN-failover may be performed or at least indicated, but there may be other conditions which disallow or contraindicate the failover. Additionally, the figures assume that a back-end device is used only for the particular VLUN under discussion and no other VLUN. If multiple VLUNs are using a single back-end device, further process accommodation is necessary.

Figure 5A:
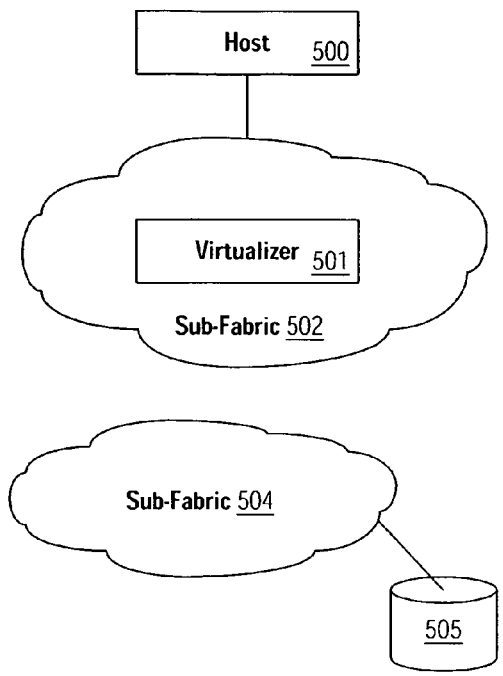

In FIG. 5A, subfabrics 502 and 504 are shown. Subfabric 502 includes virtualizer 501 which is accessible by host 500. Subfabric 504 can see physical storage device 505. Thus, host 500 can access the VLUN in virtualizer 501, but the virtualizer cannot access back-end devices. If there is a passive path from subfabric 502 to disk 505, a path failover operation for the disk 505 can be attempted. Alternatively, if there is another HBA on host 500 connected to subfabric 504 and subfabric 504 has another virtualizer, ownership of the VLUN can failover to that virtualizer in subfabric 504.

Figure 5B:
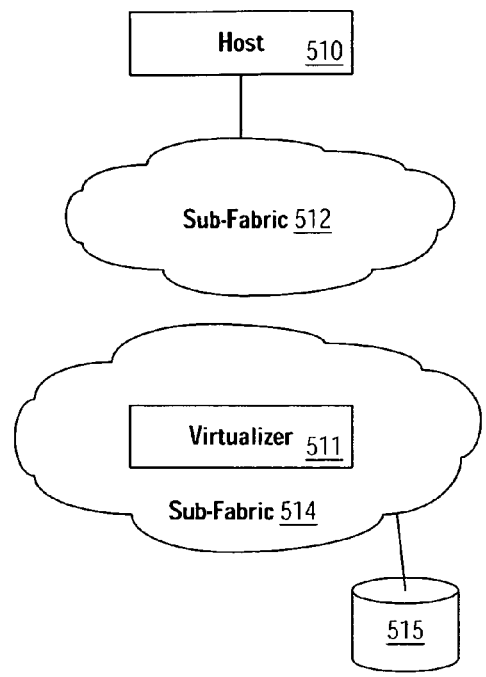

In FIG. 5B, subfabrics 512 and 514 are shown. Subfabric 514 includes virtualizer 511 which can see storage device 515 but is not accessible by host 510. Subfabric 512 can be accessed by host 510. Thus, host 510 cannot access the VLUN in virtualizer 511. If there is another HBA on host 510 connected to subfabric 514, the DMP software on host 510 can perform a failover operation to access the subfabric and thus virtualizer 511. Alternatively, if there is a passive path from subfabric 512 to disk 515 and subfabric 512 has another virtualizer, path failover for the disk 515 and VLUN ownership failover that virtualizer can be attempted.

Figure 5C:
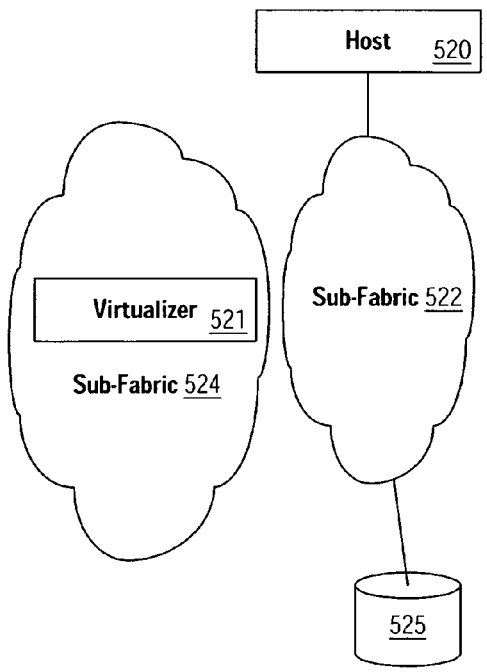

In FIG. 5C, subfabrics 522 and 524 are shown. Subfabric 524 includes virtualizer 521 which cannot see either storage device 525 or host 520. Subfabric 522 can be accessed by host 520 and can access storage device 525. Thus, host 520 cannot access the VLUN provided by virtualizer 521. In this example, the VLUN can failover to a virtualizer in subfabric 522, if any. Alternatively, if failover paths between host 520 and virtualizer 521, and between virtualizer 521 and disk 525 exist, then the dual-failover operation can be used.

Figure 5D:
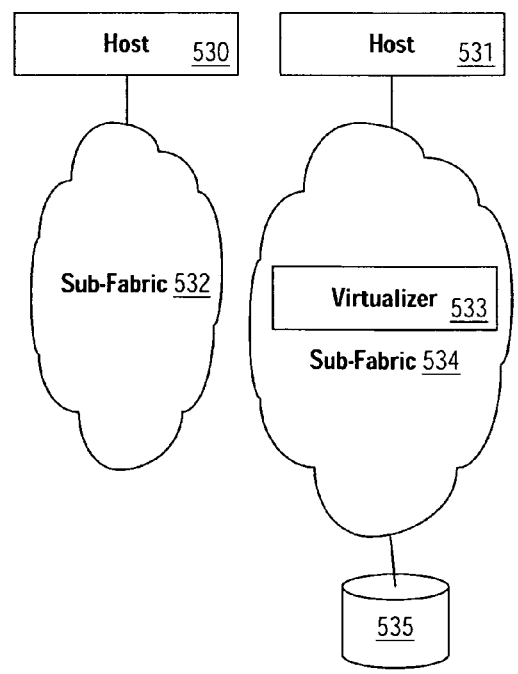

In FIG. 5D, subfabrics 532 and 534 are shown. Subfabric 534 includes virtualizer 533 which can see both storage device 535 and host 531. However, host 530 is connected to subfabric 532, which cannot access storage device 535. Thus, one of the hosts can access the VLUN, while another cannot. Since operation appears normal for host 531, the preferred action may be to do nothing to jeopardize the connectivity of host 531 to the VLUN. If there is some policy condition met, e.g., host 530 has greater priority, I/O needs, etc., then it may be preferred that host 530 be given access to the VLUN. Thus, if there is a passive path from subfabric 532 to disk 535 and subfabric 532 has another virtualizer, path failover for the disk 535 and VLUN ownership failover to that virtualizer can be attempted. In still another example, an HBA failover can be attempted on 530 to give host 530 (and potentially host 531) access to virtualizer 533.

In FIG. 5E, subfabrics 542 and 544 are shown. Subfabric 542 includes virtualizer 543 which can see host 540, but cannot access storage device 545 and is not accessible by host 541. Host 541 is connected to subfabric 544 which can access storage device 545. Thus, while one host can access the virtualizer and the other cannot, the virtualizer cannot access the storage device needed to present the VLUN. In this circumstance, one option is to failover the VLUN to subfabric 544 if a virtualizer is available in that subfabric. Alternatively, if there is a passive path from subfabric 542 to storage device 545 then path failover can be considered. If that action is taken, it may also be desirable to failover host 541 to a path connecting it to subfabric 542, assuming such a failover option is available.

In FIG. 5F, subfabrics 552 and 554 are shown. Subfabric 552 includes virtualizer 551 which can see host 550 and can access storage device 556, but cannot access storage device 555. Subfabric 554 can access storage device 555. Thus, at least one back-end device is not accessible to the virtualizer and the host. If there is a passive path from subfabric 552 to storage device 555, path failover to access disk 555 can be performed. Such an operation would consider whether the failover would affect connectivity to storage device 556, and if so whether connectivity to storage device 555 should take priority. Alternatively, if storage device 556 has passive path from subfabric 554 and host 550 has another HBA connected to subfabric 554, ownership of the VLUN could failover to a virtualizer in subfabric 554.

In FIG. 5G, subfabrics 562 and 564 are shown. Subfabric 562 includes virtualizer 561 which cannot see host 560 and cannot access storage device 566, but can access storage device 565. Thus, the host cannot access the VLUN. If there is a passive path to storage device 565 from subfabric 564, path failover can be performed for storage device 565 to make it accessible from subfabric 564. A subsequent failover of the VLUN to a virtualizer in subfabric 564 would also need to be performed. Alternatively, if there is another HBA on host 560 connected to subfabric 562 and another path for storage device 566 from subfabric 562, failover of the path to storage device 566 can be performed and the host can failover the front-end path to virtualizer 561.

In FIG. 5H, subfabrics 572 and 574 are shown. Subfabric 574 includes virtualizer 573 which can see host 571 and storage device 576, but cannot access storage device 575 or host 570. Subfabric 572 can only access host 570 and storage device 575. If there is a passive path from subfabric 574 to storage device 575, path failover for 575 can be performed, again considering the operation's impact on the functional subfabric 574. Alternatively, if there is a passive path from subfabric 572 to storage device 576, VLUN failover to subfabric 572 and path failover for storage device 576 can be performed.

In general, numerous different steps can be taken to make one or more VLUNs available. The merits of each solution will typically be analyzed at runtime to determine which solution (or solutions) to execute. All the scenarios described in connection with FIGS. 5A-5H are only examples, and are not exhaustive. Moreover, when attempting to repair a SAN fabric in this manner, there will typically be multiple VLUNs exported by each virtualizer and multiple virtualizers. Thus, possible actions to be taken are examined against various policies or system constraints as mentioned above. Thus, a collective decision taken at runtime will typically be based on several policies.

Figure 6:
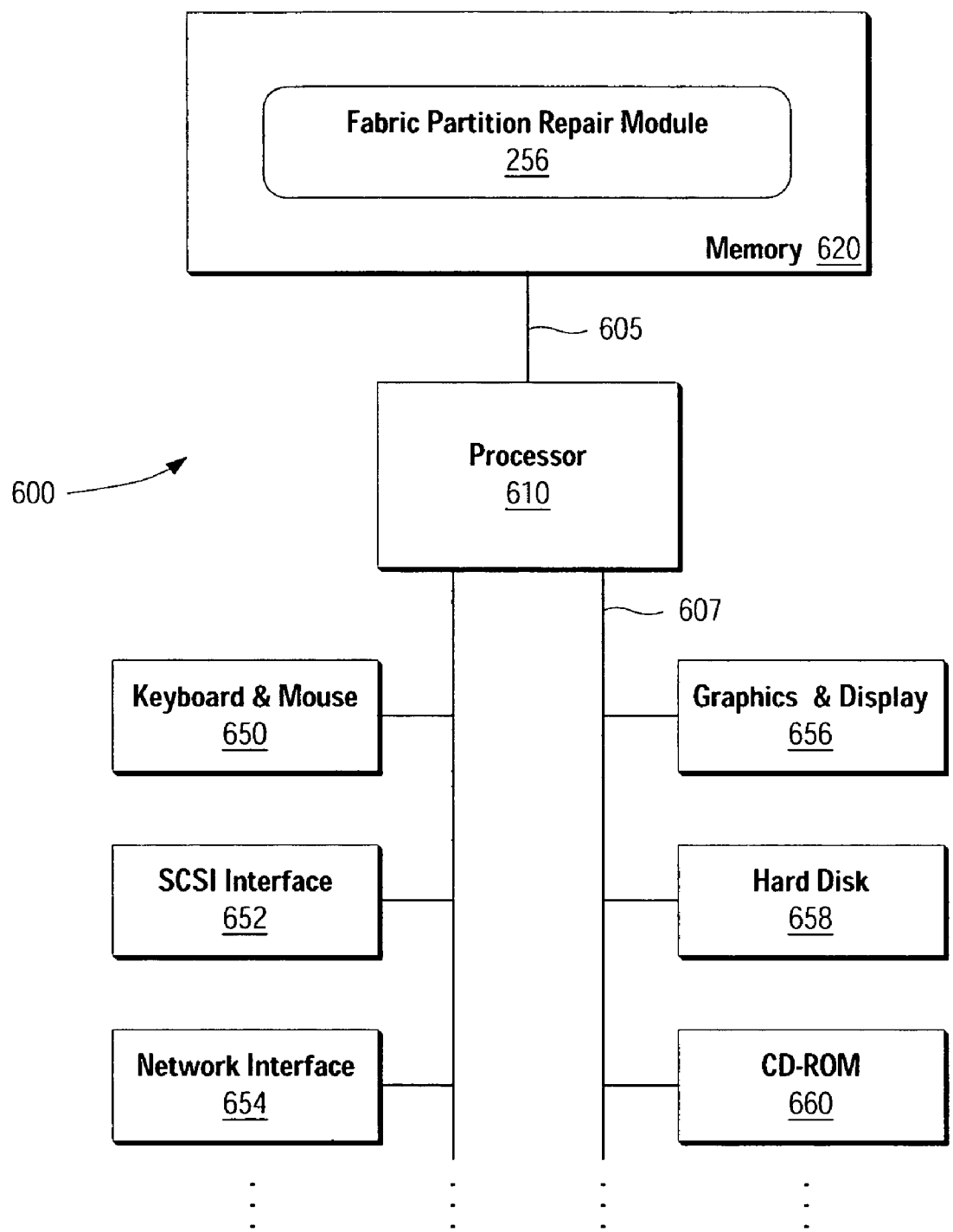
FIG. 6 is a block diagram of a computer system for implementing the techniques of the present invention.

FIG. 6 illustrates a block diagram of a computer system 600 for implementing the techniques of the present invention. For example, computer system 600 can be an embodiment of one of the previously described fabric manager, nodes, client computer systems, host computer systems, or even network and storage appliances. Computer system 600 includes a processor 610 and a memory 620 coupled together by communications bus 605. Processor 610 can be a single processor or a number of individual processors working together. Memory 620 is typically random access memory (RAM), or some other dynamic storage device, and is capable of storing instructions to be executed by the processor, e.g., fabric partition repair module 256. Memory 620 is also used for storing temporary variables or other intermediate information during the execution of instructions by the processor 610.

Those having ordinary skill in the art will readily recognize that the techniques and methods discussed above can be implemented in software using a variety of computer languages, including, for example, traditional computer languages such as assembly language, Pascal, and C; object oriented languages such as C++, C# and Java; and scripting languages such as Perl and Tcl/Tk. Additionally, software 256 can be provided to the computer system via a variety of computer readable media including electronic media (e.g., flash memory), magnetic storage media (e.g., hard disk 658, a floppy disk, etc.), optical storage media (e.g., CD-ROM 660), and communications media conveying signals encoding the instructions (e.g., via a network coupled to network interface 654).

Computer system 600 also includes devices such as keyboard & mouse 650, SCSI interface 652, network interface 654, graphics & display 656, hard disk 658, and CD-ROM 660, all of which are coupled to processor 610 by communications bus 607. It will be apparent to those having ordinary skill in the art that computer system 600 can also include numerous elements not shown in the figure, such as additional storage devices, communications devices, input devices, and output devices, as illustrated by the ellipsis shown. An example of such an additional computer system device is a fibre channel interface.

Although the present invention has been described with respect to a specific preferred embodiment thereof, various changes and modifications may be suggested to one skilled in the art and it is intended that the present invention encompass such changes and modifications that fall within the scope of the appended claims.

What is claimed is:

1. A method comprising:
   receiving information indicating a partition of a storage area network (SAN) fabric into a plurality of subfabrics, wherein the SAN fabric includes a SAN device configured to present a virtual storage device;
   analyzing, in response to the receiving the information indicating the partition, information describing connectivity of the SAN device to at least one of a host computer system, a physical storage device, and another SAN device;
   determining whether the SAN device can continue to present the virtual storage device subsequent to the partition, in response to the analyzing the information describing connectivity of the SAN device; and
   allowing the virtual storage device to be accessed by at least one of the host computer system and another host computer system when it is determined that the SAN device can continue to present the virtual storage device.

2. The method of claim 1 wherein the receiving information indicating a partition of a storage area network fabric further comprises:
   receiving information from the SAN device indicating partition of a SAN.

3. The method of claim 1 further comprising at least one of:
   detecting a failure to receive a heartbeat signal on a communication link between the SAN device and a second SAN device; and
   polling a name server to determine SAN fabric membership information.

4. The method of claim 1 further comprising:
   receiving the information describing connectivity of the SAN device from the SAN device.

5. The method of claim 1 wherein the allowing the virtual storage device to be accessed further comprises:
   presenting the virtual device as a virtual logical unit (VLUN) associated with a virtual port.

6. The method of claim 1 wherein the determining further comprises at least one of:
   identifying subfabrics having at least one associated SAN device;
   determining whether a physical storage device associated with the virtual storage device is accessible by the SAN device; and
   determining whether a host using the virtual storage device before partition of the SAN fabric can access the SAN device.

7. The method of claim 1 wherein the SAN device is coupled to the host computer system via a plurality of communication pathways, the method further comprising at least one of:
   selecting an alternate communication pathway of the plurality of communication pathways in case of a failure of one of the plurality of communication pathways; and
   changing a current communications pathway from a first one of the plurality of communication pathways to a second one of the plurality of communication pathways.

8. The method of claim 1 wherein the SAN device is coupled to the physical storage device via a plurality of communication pathways, the method further comprising at least one of:
   selecting an alternate communication pathway of the plurality of communication pathways in case of a failure of one of the plurality of communication pathways; and
   changing a current communications pathway from a first one of the plurality of communication pathways to a second one of the plurality of communication pathways.

9. The method of claim 1 wherein the SAN device is at least one of: a computer system, a cluster node, a storage appliance, a network appliance, and a SAN switch.

10. The method of claim 1 further comprising:
    suspending a plurality of input/output (I/O) operations targeting the virtual storage device.

11. A system comprising:
a memory;
a processor coupled to the memory; and
a storage area network (SAN) fabric repair module wherein at least a portion of the SAN fabric repair module is encoded as instructions stored in the memory and executable on the processor, and wherein the SAN fabric repair module is configured to:
receive information indicating a partition of an SAN fabric into a plurality of subfabrics, wherein the SAN fabric includes an SAN device configured to present a virtual storage device;
analyze, in response to receipt of the information indicating the partition, information describing connectivity of the SAN device to at least one of a host computer system, a physical storage device, and another SAN device;
determine whether the SAN device can continue to present the virtual storage device after the partition of the SAN fabric, in response to analysis of the information describing connectivity of the SAN device; and
allow the virtual storage device to be accessed by at least one of a host computer system and another host computer system when it is determined that the SAN device can continue to present the virtual storage device.

12. The system of claim 11 further comprising:
an SAN comprising at least one SAN fabric;
an SAN device configured to present the virtual storage device; and
a physical storage device coupled to the SAN device.

13. The system of claim 11 further comprising:
a second SAN device coupled to the SAN device via a communication link, wherein the second SAN device is configured to transmit a heartbeat signal to the SAN device.

14. The system of claim 11 wherein the SAN device is at least one of:
a computer system, a cluster node, a storage appliance, a network appliance, and an SAN switch.

15. The system of claim 11 further comprising:
an SAN access module configured to discover at least one of: available SAN devices, SAN device attributes, and physical connections to SAN devices.

16. The system of claim 11 wherein the SAN fabric repair module is further configured to:
receive the information identifying connectivity of the SAN device from the SAN device.

17. The system of claim 11 wherein the SAN fabric repair module is further configured to:
receive information from the SAN device indicating partition of an SAN.

18. The system of claim 11 wherein the SAN fabric repair module is further configured to:
instruct the SAN device to present the virtual device as a virtual logical unit (VLUN) associated with a virtual port.

19. The system of claim 11 wherein the SAN fabric repair module is further configured to:
identify subfabrics having at least one associated SAN device;
determine whether a physical storage device associated with the virtual storage device is accessible by the SAN device; and
determine whether a host using the virtual storage device before partition of the SAN fabric can access the SAN device.

20. A computer readable storage medium comprising program instructions executable on a processor, wherein the program instructions are operable to implement each of:
receiving information indicating a partition of a storage area network (SAN) fabric into a plurality of subfabrics, wherein the SAN fabric includes a SAN device configured to present a virtual storage device;
analyzing, in response to the receiving the information indicating the partition, information describing connectivity of the SAN device to at least one of a host computer system, a physical storage device, and another SAN device;
determining whether the SAN device can continue to present the virtual storage device subsequent to the partition, in response to the analyzing the information describing connectivity of the SAN device; and
allowing the virtual storage device to be accessed by at least one of the host computer system and another host computer system when it is determined that the SAN device can continue to present the virtual storage device.

21. The computer readable storage medium of claim 20 further comprising program instructions operable to implement:
receiving information from the SAN device indicating partition of a SAN.

22. The computer readable storage medium of claim 20 further comprising program instructions operable to implement at least one of:
detecting a failure to receive a heartbeat signal on a communication link between the SAN device and a second SAN device; and
polling a name server to determine SAN fabric membership information.

23. The computer readable storage medium of claim 20 further comprising program instructions operable to implement:
receiving the information describing connectivity of the SAN device from the SAN device.

24. The computer readable storage medium of claim 20 wherein the program instructions operable to implement the allowing the virtual storage device to be accessed further comprises program instructions operable to implement:
presenting the virtual device as a virtual logical unit (VLUN) associated with a virtual port.

25. The computer readable storage medium of claim 20 wherein the program instructions operable to implement the determining further comprises program instructions operable to implement at least one of:
identifying subfabrics having at least one associated SAN device;
determining whether a physical storage device associated with the virtual storage device is accessible by the SAN device; and
determining whether a host using the virtual storage device before partition of the SAN fabric can access the SAN device.

26. The computer readable storage medium of claim 20 wherein the SAN device is coupled to the host computer system via a plurality of communication pathways, and further comprising program instructions operable to implement at least one of:
selecting an alternate communication pathway of the plurality of communication pathways in case of a failure of one of the plurality of communication pathways; and
changing a current communications pathway from a first one of the plurality of communication pathways to a second one of the plurality of communication pathways.

27. The computer readable storage medium of claim 20 wherein the SAN device is coupled to the physical storage device via a plurality of communication pathways, and further comprising program instructions operable to implement at least one of:
- selecting an alternate communication pathway of the plurality of communication pathways in case of a failure of one of the plurality of communication pathways; and
- changing a current communications pathway from a first one of the plurality of communication pathways to a second one of the plurality of communication pathways.

28. The computer readable storage medium of claim 20 wherein the SAN device is at least one of: a computer system, a cluster node, a storage appliance, a network appliance, and a SAN switch.

29. An apparatus comprising:
- a network interface means for receiving information indicating a partition of a storage area network (SAN) fabric into a plurality of subfabrics, wherein the SAN fabric includes a SAN device configured to present a virtual storage device;
- a means for analyzing information describing connectivity of the SAN device to at least one of a host computer system, a physical storage device, and another SAN device, in response to receipt of the information indicating the partition;
- a means for determining whether the SAN device can continue to present the virtual storage device subsequent to the partition, in response to analysis of the information describing connectivity of the SAN device; and
- a means for allowing the virtual storage device to be accessed by at least one of the host computer system and another host computer system when it is determined that the SAN device can continue to present the virtual storage device.

30. The apparatus of claim 29 further comprising:
a means for receiving information describing connectivity of the SAN device from the SAN device.

31. The apparatus of claim 29 further comprising:
presenting the virtual device as a virtual logical unit (VLUN) associated with a virtual port.

32. The apparatus of claim 29 wherein the means for determining further comprises at least one of:
- a means for identifying subfabrics having at least one associated SAN device;
- a means for determining whether a physical storage device associated with the virtual storage device is accessible by the SAN device; and
- a means for determining whether a host using the virtual storage device before partition of the SAN fabric can access the SAN device.

* * * * *